Aug. 10, 1965     HANS-JÖRG METZGER     3,200,334
MOVING COIL METER WITH SYMMETRICALLY DISPOSED
RADIALLY AND AXIALLY EXTENDING COIL LEADS
Filed Dec. 12, 1960                       3 Sheets-Sheet 1

INVENTOR:
Hans-Jörg Metzger
By Robert C. Abelson
Agent.

INVENTOR:
Hans-Jörg Metzger
Robert E. Abelson
Agent.

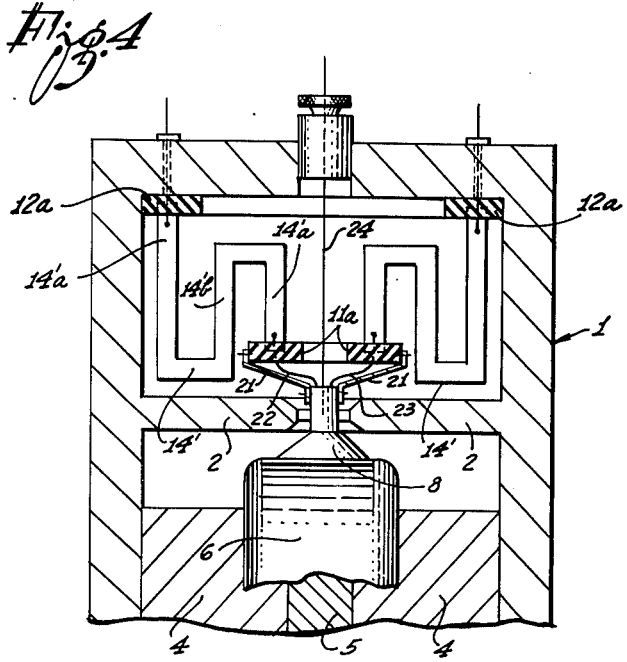
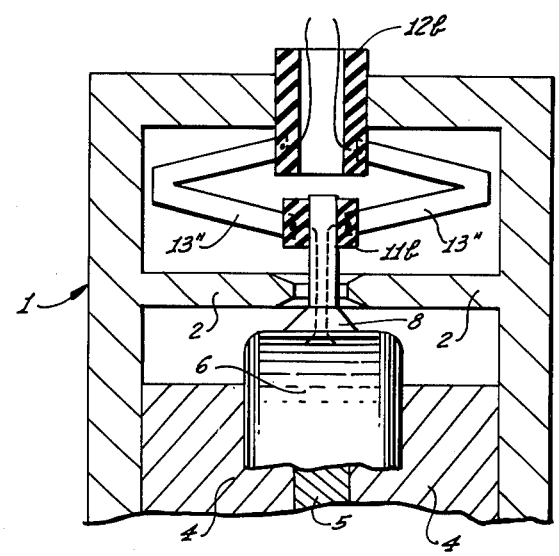

3,200,334
MOVING COIL METER WITH SYMMETRICALLY DISPOSED RADIALLY AND AXIALLY EXTENDING COIL LEADS
Hans-Jörg Metzger, Furtwangen, Black Forest, Germany, assignor to Fritz Hellige & Co., G.m.b.H., Freiburg, Germany
Filed Dec. 12, 1960, Ser. No. 75,430
Claims priority, application Germany, Dec. 11, 1959, H 38,120
14 Claims. (Cl. 324—154)

The present invention relates to moving coil meters, and more particularly to moving coil meters and fast writing recorders operable at frequencies greater than one hundred cycles per second.

Recent advances in the fields of biological and medical research have lead to an increased demand for meters and fast writing recorders with operating frequencies in excess of 100 cycles per second. Where such meters and recorders are of the moving coil type, the problem of arranging the leads to the moving coil so as to interfere as little as possible with the motion of the coil becomes particularly acute. Short leads, which would contribute little additional mass to the moving system, generally have a stiffness which cannot be neglected, while relatively longer leads contribute excessive mass and raise the inertia of the coil. The use of longer leads may also require enlargement of the entire meter. Where the moving coil system has several windings, as in the case of ratiometers, meters for current addition, etc., the number of leads required in general will be twice the number of windings, and the problem of arranging the leads to contribute the least possible mass and elastic restraint to the moving coil system becomes particularly acute.

It is, therefore, an object of the present invention to provide a moving coil meter of improved frequency response having relatively long leads to the moving coil of the meter.

Another object of the present invention is to provide a moving coil meter having relatively long leads to the moving coil of the meter arranged in a compact and space-saving manner.

Yet another object of the present invention is to provide a moving coil meter wherein the leads to the moving coil have a low reaction on the motion of the moving coil.

A further object of the invention is to provide a moving coil meter having any number of leads to the moving coil which nevertheless add little additional mass to the moving coil, and impose a predetermined restraint upon it.

A moving coil meter, according to the present invention, comprises a relatively rigid frame, a moving coil disposed within the frame for motion with respect thereto, and a plurality of current leads for establishing electrical connection to the winding of the coil, the current leads being symmetrically disposed about the axis of the moving coil, and having their ends rigidly affixed to the frame and the coil in such a manner that each lead includes two legs disposed at an angle not greater than 90° with respect to each other and lying in a substantially radial plane of the axis of the moving coil.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIG. 4 and FIG. 5 are front views, partially in section and cutaway, of other embodiments of the invention.

Figure 1:
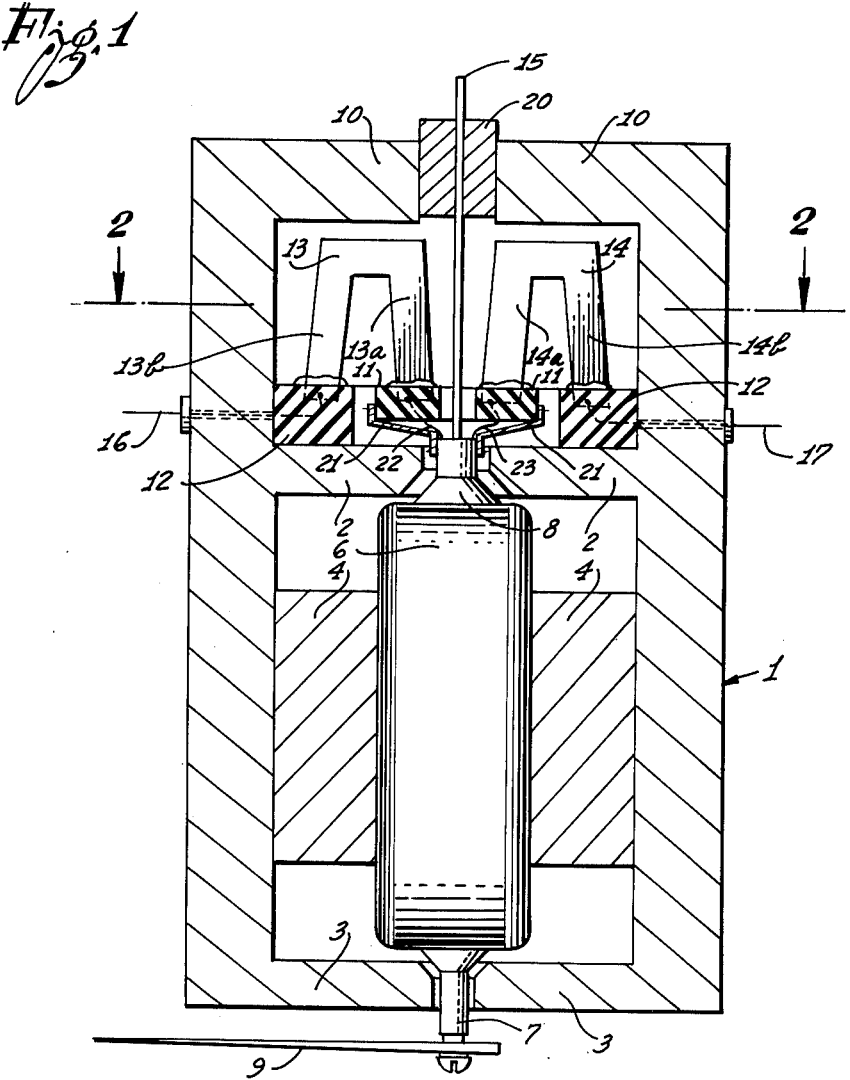
FIG. 1 is a front view, partially in section, of one embodiment of a moving coil meter according to the present invention.

Referring now to the drawings wherein the same reference characters designate the same or similar elements in the several views, there is shown in FIG. 1 a front view, partially in section, of one embodiment of a moving coil meter according to the invention. As shown in FIG. 1, the embodiment comprises a frame 1 with a plurality of internal flanges or rings 2, 3 and 10 for guiding and supporting a moving coil 6, and current leads 13 and 14 connected thereto. Frame 1 also includes a pair of arms 4 for supporting a soft iron core 5 (shown in FIGS. 4 and 5) within coil 6 to concentrate the lines of magnetic flux produced by a magnet system 18, 19 (shown in FIG. 2). A pair of spindles 7, 8, are each affixed to an end of moving coil 6, respectively, and define the axis of rotation of coil 6. Spindles 7 and 8 extend through flanges 2 and 3 to provide bearings for the coil 6. Bearings of this type are especially useful when it is desired to include means for locking moving coil 6 when the meter is not in use, and for freely suspending the coil 6 in working position when in use. Lower spindle 7 may carry, in addition, an element 9 for indicating the result of a measurement made with the meter. Element 9 may comprise a pointer, a hand, or any of the well-known writing devices. The ends 22 and 23 of coil 6 are arranged to pass through upper spindle 8.

Moving coil 6, may be of ring or preferably, rectangular form. FIG. 1 is a view of the sides of the coil and the coil openings through which arms 4 pass to support iron core 5 are not visible. Spindles 7 and 8 define the axis of rotation of moving coil 6, which passes symmetrically through the opposite upper and lower ends of the coil. A torsion element, such as a torsion spring 15, which lies in axis of rotation of the coil is connected at one end to the frame flange 10 by means of a socket 20 and at its other end to upper spindle 8. Torsion spring 15 serves as the elastic restraint for restoring moving coil 6 to its zero position defined by the plane of the magnet system 18, 19, from which it is deflected by a current passing through the winding of the coil 6. At least two separate current leads 13 and 14 are arranged to connect winding ends 22 and 23 to a pair of outer connections 16 and 17 for the meter.

Current leads 13 and 14 are arranged in a symmetrical fashion about the motional axis of moving coil 6 and each has one end rigidly affixed to the moving coil, while the remaining end is rigidly affixed to the frame in such a manner that each lead includes at least two legs 13a and 13b and 14a and 14b respectively, the legs being disposed at an angle not greater than 90° with respect to each other and lying in a substantially radial plane, i.e. a plane through the axis of rotation of coil 6.

Preferably, connection between the current leads 13, 14, and the ends 22, 23, of the winding of the moving coil may be made at a ring-shaped contact holder 11, which is rigidly affixed to and moves with the moving coil 6, and to the outer connections 16, 17, at a ring-shaped contact holder 12 which is rigidly affixed to the frame 1.

It will be readily recognized that such an embodiment of the invention permits the use of relatively long current leads imposing small or at least predetermined elastic restraint on the suspension system of the meter, in a relatively compact and space-saving configuration of enhanced utility and convenience.

The two contact holders 11 and 12 are preferably arranged concentrically to the axis of rotation of the moving coil 6 and may, as can be seen from FIG. 1, also be located concentrically to each other. Inner contact holder 11 may be connected rigidly to upper spindle 8 by means of a bracket 21. The ends of current leads 13, 14, are spaced on contact sockets 11 and 12 as symmetrically as possible about the axis of rotation of the coil and may, for example, be located at points corresponding to the corners of regular polygons so that the points are at equal distances from the axis of rotation. With such an arrangement the influence of the current leads on the motion of the coil will remain symmetrical when the coil has been deflected from its zero position.

Figure 2:
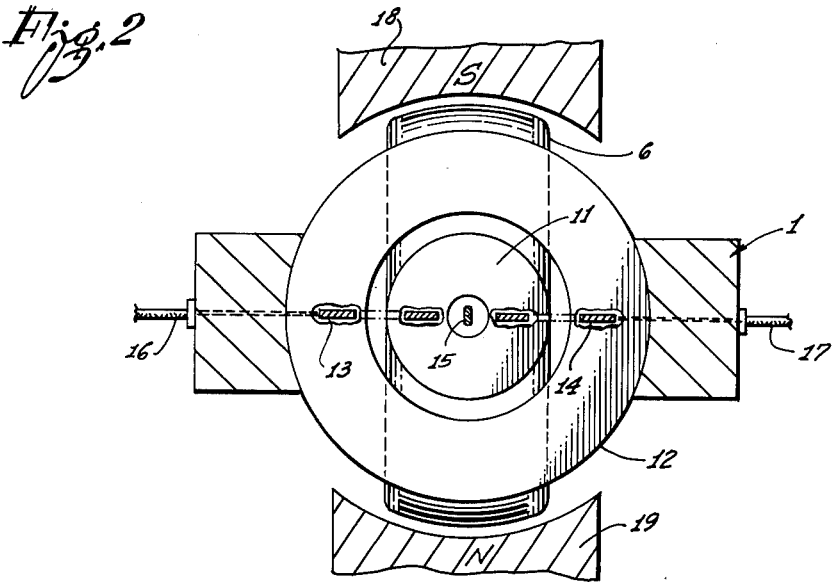
FIG. 2 is a view in section taken on the line 2—2 of FIG. 1.

FIG. 2 is a view in section taken on the line 2—2 of FIG. 1 showing the arrangement of current leads 13 and 14 relative to the axis of rotation of the moving coil 6 in which torsion spring 15 lies.

Figure 3:
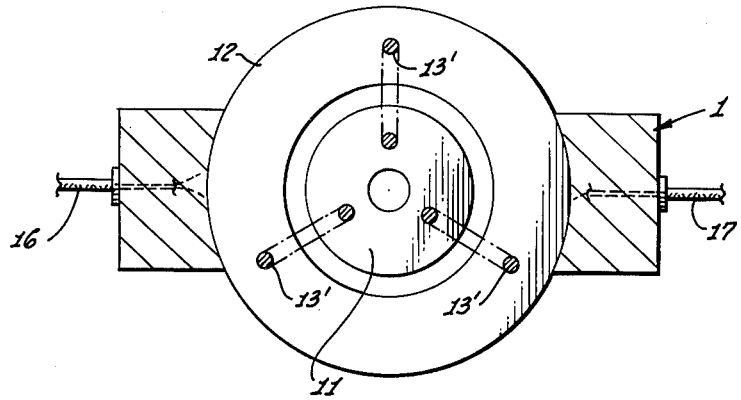
FIG. 3 is a view in section of another embodiment of the invention taken on substantially the same line as that of FIG. 2.

FIG. 3 is a view in section of another embodiment of the invention taken on substantially the same line as that of FIG. 2 and differing therefrom in the use of three currents leads 13'.

FIG. 5 is an embodiment of the invention illustrating the use of two contact holders 11b and 12b arranged concentrically to the axis of rotation of the coil but not concentrically with respect to each other.

The contact holders 11 and 12, 11a and 12a, or 11b and 12b may comprise either rigid insulating bodies such as ceramic plates, or metal bodies in ring, disc, or star-shaped form with suitable insulating inserts for the conductive elements affixed thereto. As shown in FIG. 2, leads 13 and 14 may comprise flat pieces of sheet metal lying in planes which also include the axis of the moving coil. As shown in FIG. 3 the current leads 13' may comprise bent, round rods or round wires.

Since the symmetry of the current leads about the motional axis of the coil is maintained when the coil is deflected by current to be measured, the current leads 13, 14, 13', 14' and 13" may also be used to provide elastic restraint for the coil or at least to contribute a portion of such elastic restraint. In general, therefore, special torsion means such as torsion element 15 need not necessarily be included in the structure. The current leads may also comprise the sole mounting for the moving coil 6 as shown in FIG. 5, thereby obviating the use of a suspension wire such as suspension wire 24 shown in the embodiment of the invention of FIG. 4.

If current leads 13, 14 are so used, it is possible, as well known in the art, to provide special locking devices, not shown in the figures, to eliminate the effect of shocks on the suspension when the meter is being moved about.

The embodiment of the invention shown in FIG. 4 illustrates the use of current leads 14' which include substantially S-shaped portions between the coil side contacts and the frame side contacts of the contact holders, respectively, so that each includes at least three substantially parallel legs which lie in a plane including the axis of rotation of the moving coil 6 when the coil is undeflected, the legs being designated 14'a, 14'b and 14'c. If more than three current leads are required for the moving coil, the leads may be arranged, according to the invention, both above and below the moving coil. Other modifications or alterations falling within the scope of the present invention will be obvious to those skilled in the art.

What is claimed as new is:

1. A moving coil meter comprising a relatively rigid frame, a moving coil having at least one winding supported within the frame for motion with respect thereto about an axis, and a plurality of current leads for establishing electrical connection to the winding of said coil, said current leads being symmetrically disposed about the axis of said coil, and having their ends affixed to said frame and said coil, each of said leads including two interconnected legs extending substantially parallel to the axis of rotation of said coil.

2. The moving coil meter set forth in claim 1 wherein each of said leads lies in a plane including the axis of said coil.

3. The moving coil meter set forth in claim 1 wherein each of said leads comprises a leaf-like flat sheet lying in a plane including the axis of said coil.

4. The moving coil meter set forth in claim 1 wherein each of said leads comprises a bent round wire.

5. The moving coil meter set forth in claim 1 including means for supporting said coil within said frame and providing elastic restraint to motion of said coil comprising a straight torsion bar lying in the axis of rotation of said coil and having first and second ends coupled to said frame and said coil, respectively.

6. The moving coil meter set forth in claim 1 including means for supporting said coil within said frame without imposing restraint on the motion of said coil comprising a relatively thin wire lying in the axis of rotaton of said coil and having first and second ends coupled to said frame and said coil, respectively.

7. A moving coil meter, comprising a relatively rigid frame, a moving coil having at least one winding supported within the frame for motion with respect thereto about an axis, and a plurality of current leads, disposed in radial symmetry about the axis of rotation of the moving coil, for establishing electrical connection to the winding of said coil, each of said leads including a unitary cut-out section of thin sheet metal having a shape which is curved within the sheet plane to form first and second end portions and a center portion interconnecting the end portions, means for affixing said first end portion to said coil, and means for affixing said second end portion to said frame, the end portions extending at least partly substantially parallel to the axis of rotation, and the center portion of each lead being axially offset with respect to at least one of the end portions.

8. A moving coil meter, comprising a relatively rigid frame, a moving coil having at least one winding supported within the frame for motion with respect thereto about an axis, and a plurality of current leads, disposed in radial symmetry about the axis of rotation of the moving coil, for establishing electrical connection to the winding of said coil, each of said leads including a unitary cut-out section of thin sheet metal having a shape which is curved within the sheet plane to form first and second leg portions disposed at angles less than 90° with respect to the axis of rotation of the coil and a center portion interconnecting the leg portions, means for affixing said first leg portion to said coil, and means for affixing said second leg portion to said frame, the end portions extending at least partly substantially parallel to the axis of rotation, and the center portion of each lead being axially offset with respect to at least one of the leg portions.

9. In a moving coil meter, a relatively rigid frame, a moving coil having at least one winding supported within the frame for rotational motion about an axis, and means for establishing electrical connections to the moving coil of the meter including a plurality of current leads symmetrically disposed about the axis of rotation of the moving coil within the space between said frame and said coil, each of said leads comprising a leaf-like flat sheet disposed in a plane containing said axis, said leads, having first and second ends secured to said frame and coil, respectively, and including first and second legs interconnected by a center portion, said legs being disposed at an angle of less than 90° with respect to the axis of rotation of the coil, the center portion being axially offset with respect to at least one of said ends.

10. The moving coil set forth in claim 9, wherein said first and second ends of said leads are secured to a first contact holder affixed to the coil and a second contact holder secured to the frame, respectively, the locations at which the lead ends are secured to the contact holder lying in first and second concentric circles about the axis of said moving coil.

11. A moving coil meter, comprising a relatively rigid frame, a moving coil having at least one winding disposed within said frame and movable with respect thereto about an axis, a plurality of current leads symmetrically disposed intermediate said frame and said coil for establishing an electrically conductive connection between said coil and an external circuit, each of said leads having first and second ends, and having a generally U-shaped portion intermediate said ends, the legs of the U-shaped portion extending substantially parallel to the axis of rotation of the coil, means for symmetrically affixing said first end to said coil and establishing electrical connection between said first end and said winding, and means for symmetrically affixing said second end to said frame and establishing electrical connection between said second end and an external circuit, the section of the U-shaped portion interconnecting the legs being axially offset with respect to at least one of said ends.

12. The moving coil meter set forth in claim 11, wherein said current leads provide a predetermined elastic restraint to motion of said coil.

13. The moving coil meter set forth in claim 11, wherein said current leads have a coefficient of elasticity selected to provide support for said coil within said frame and a predetermined elastic restraint to motion of said coil in response to current flowing therethrough.

14. A moving coil meter comprising a relatively rigid frame, a moving coil having at least one winding supported within the frame for rotational motion with respect thereto about an axis, and a plurality of substantially S-shaped current leads for establishing electrical connection to the winding of said coil, said current leads being symmetrically disposed about the axis of said coil, and having their ends affixed to said frame and said coil, each of said S-shaped leads including three interconnected legs extending substantially parallel to the axis of rotation of said coil.

References Cited by the Examiner
UNITED STATES PATENTS

| | | | |
|---|---|---|---|
| 799,733 | 9/05 | Hartmann | 324—154 |
| 2,901,703 | 8/59 | Plunkett | 324—155 |

WALTER L. CARLSON, *Primary Examiner.*

ELI J. SAX, *Examiner.*